United States Patent Office 3,120,161
Patented Feb. 4, 1964

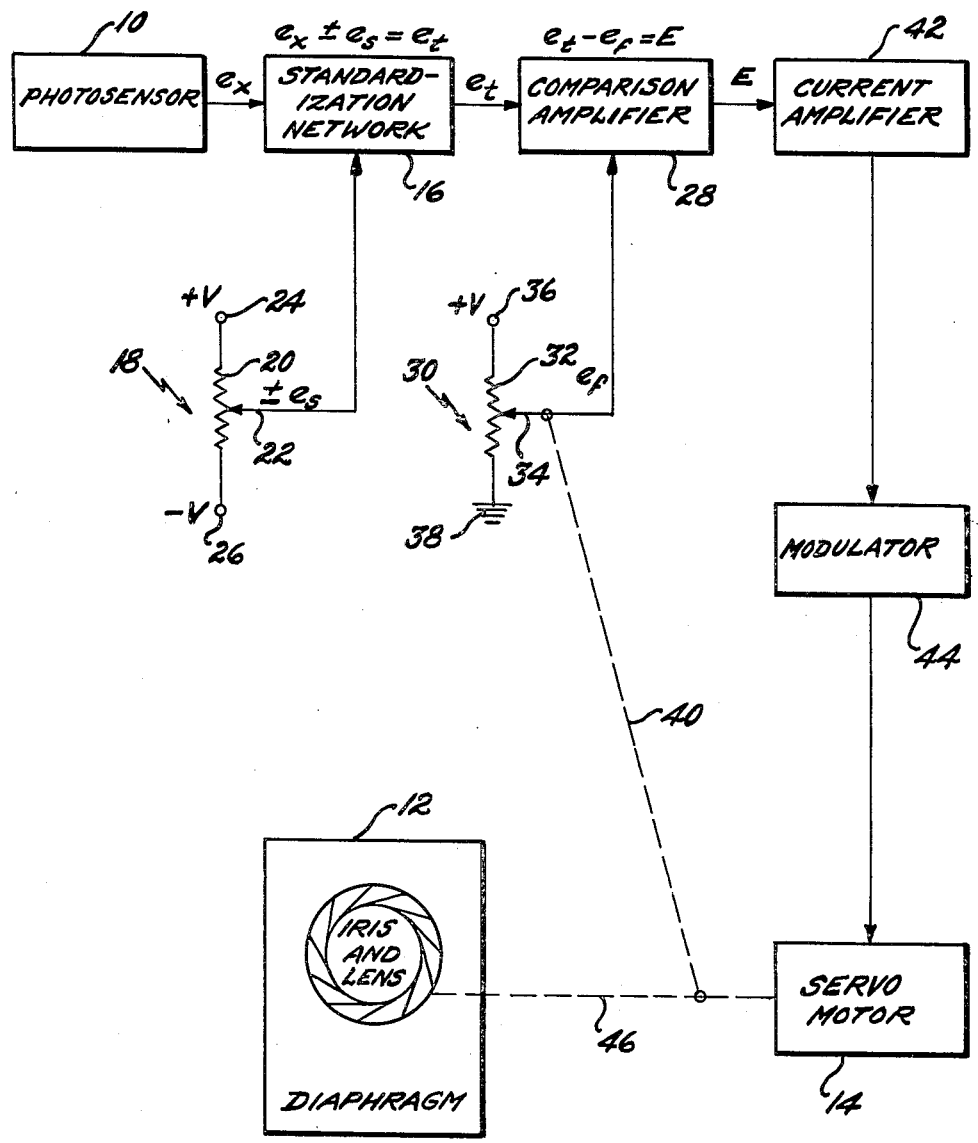

3,120,161
DIAPHRAGM CONTROLLING SYSTEM
De Witt H. Pickens, Los Angeles, Calif., and George F. Warnke, Skokie, Ill., assignors to the United States of America as represented by the Secretary of the Air Force
Filed Oct. 18, 1961, Ser. No. 146,052
2 Claims. (Cl. 95—64)

The present invention relates to image-reproducing devices; such as cameras, and more particularly, to a system for controlling the light energy impinging on a recording medium in accordance with a preselectable light-energy sensitivity for the system.

The present invention comprehends a control system for expanding the range of film speeds and exposure time that can be used with an image-reproducing device. Accordingly, it is an object of the present invention to provide an electrical control system for controlling the light energy impinging on a recording medium in accordance with a preselectable light-energy sensitivity for the system.

It is a second object of the present invention to provide an electrical control system for controlling the light energy impinging on a recording medium in accordance with a preselectable light-energy sensitivity, which system includes a closed servo loop.

It is a third object of the present invention to provide an electrical control system for controlling the $f$-setting characteristics of an image-reproducing device of a substantially wide range in accordance with a preselectable light-energy sensitivity.

It is a fourth object of the present invention to provide an electrical control system for controlling the light energy impinging on a recording medium by means of a closed loop, positional servo device energizable by an error signal developed as a function of a preselectable signal provided for establishing the sensitivity of the system.

It is a fifth object of the present invention to provide an electrical control system for controlling the f-setting characteristics of an image-reproducing device by means of a closed loop, positional servo device in accordance with the light intensity of a viewed scene and a preselectable sensitivity established for the system.

Accordingly, a photosensor device is disposed on the image-reproducing device to view a scene in the same manner as a lens device or lens devices included in an iris or irises in said device. A first electrical signal is generated by the photosensor device dependent upon the light energy available at the scene. A preselectable electrical signal is provided for adjusting the sensitivity of the system to light energy. A circuit is provided for obtaining a third electrical signal as a function of said first and preselectable signals, which is a threshold signal about which the system operates. Iris or aperture controlling means is provided for controlling the light energy passing through said iris and a lens device included therein. A servo motor is connected to and drives said controlling means in response to an error signal. The error signal is generated as a function of said threshold signal and a feedback signal which is generated for the instantaneous positions of the servo motor and the iris-controlling means driven thereby. Thus, once the sensitivity of the system is established by preselecting the electrical signal aforementioned, the closed loop, servo motor operates to control the iris-controlling means in accordance with variations in light-energy intensity occurring in the viewed scene. Since changing the speed of the recording medium or exposure time does not alter the light energy versus $f$-setting characteristics for a particular image-reproducing device, the sensitivity-establishing aspect of the present invention enables a wide range of speeds and recording time to be used.

These objects and others and other advantageous features of the present invention will become more apparent by referring to the following detailed description and the accompanying drawing.

Referring now to the accompanying drawing, there is shown in block diagram form, the system of the present invention. A photosensor 10, which may be a semiconductor device of the barrier layer type, is mounted on an image-reproducing device 12, such as a camera, so as to view a scene in a manner similar to a lens device or lens devices disposed in an iris or in irises. As is customary in fabricating such an image reproducing device, a diaphragm is included and connected in a manner to the lens device or devices included in an iris or irises for controlling the effective area of each lens device from a maximum to a minimum aperture position to control the light energy passing through the lens device and impinging on a recording medium (not shown). Thus, the control system adjusts the $f$-setting characteristics of the image-reproducing device. A suitable electric motor 14, such as a two-phase, servo motor, is suitably geared to the diaphragm as is well known to persons skilled in the prior art for energizing the diaphragm between its maximum and minimum positions.

The photosensor 10 is responsive to light energy impinging thereon for generating electrical energy, such as a voltage $e_x$, the magnitude of which is dependent upon the illumination of the scene, at which the photosensor and lens device is directed. A standardization network 16 is connected to and responsive to the voltage $e_x$ of the photosensor. This network may be comprised of a resistance network for obtaining a threshold voltage $e_x$, which is the algebraic sum or difference between the voltage $e_x$ and a standardization voltage $e_s$. A voltage divider 18, comprising a potentiometer 20 with a wiper arm 22, connected between a positive source 24 and a negative source 26 may be used to furnish a standardization voltage, $\pm e_s$, of variable magnitude and polarity by adjustment of the wiper arm 22. In practice, the wiper arm 22 is adjusted to control the sensitivity of the system, or stated otherwise, to control the light-energy intensity impinging on the recording film selected for use with the camera.

Accordingly, the standardization network 16 generates a threshold voltage $e_t$ which satisfies the equation $e_x \pm e_s$. A comparison amplifier 28 is connected to and responsive to the threshold voltage $e_t$ and to a feedback voltage $e_f$ to be described more fully subsequently. The comparison amplifier 28 may conveniently be a conventional amplifier, having applied to a control grid thereof the threshold voltage $e_t$ and the feedback voltage $e_f$, for generating an error signal E to reposition the servo motor 14 and the diaphragm for variations occurring in the photosensor voltage $e_x$ due to light intensity changes occurring in the scene (once the standardization voltage $e_s$ has been preselected.)

The feedback voltage $e_f$ is derived from a voltage divider 30, comprising a potentiometer 32 with a wiper arm 34, connected between a positive source 36 and a common ground 38. Depending on the voltage requirements of the system the voltage source 36 may be identical or different from the voltage source 24. The wiper arm 34 is connected to and driven by a rotating element of the servo motor 14, represented by the dashed line 40, as is well known to persons skilled in the prior art. The feedback voltage $e_f$ corresponds to instantaneous positions of the servo motor 14 and the diaphragm driven thereby.

A conventional current amplifier 42 is connected to and responsive to the error signal E generated by the comparison amplifier 28 in response to threshold voltage $e_t$ and feedback voltage $e_f$ applied thereto. An error signal E of sufficient amplitude is coupled to a modulator 44 which may conveniently be a magnetic-type, suppressed-carrier modulator, for applying a suitable voltage to one winding of the servo motor to cause proper energization thereof to have the servo motor 14 position the diaphragm suitably for the light-energy intensity impinging on the photosensor 10. The rotating element of the servo motor 14 is connected to and drives the aperture-controlling diaphragm in a manner well known to persons skilled in the prior art. The dashed line 46 represents the mechanical connection between the servo motor and the diaphragm. Accordingly, the servo motor rotates clockwise or counterclockwise depending on the polarity of the error voltage E and causes a feedback voltage $e_f$ to be developed which is proportional to the positions of said servo motor and the diaphragm driven thereby. The magnitude of the feedback voltage $e_f$ is preselected to cancel the error voltage E generated when an unbalance exists between the threshold voltage $e_t$ and said feedback voltage $e_f$. The closed loop circuit, including the servo motor, operates continuously to cancel said threshold voltage $e_t$, which under normal operating conditions is a variable depending upon variable light intensities impinging on the photosensor 10.

The standardization voltage $e_s$ is provided to eliminate the need for absolute calibration of the system. As previously mentioned, this voltage is either added to or subtracted from the photosensor voltage $e_x$ to produce a threshold level for the system. Since changing film speed or exposure time does not alter the light intensity versus $f$-setting characteristic for a particular camera, but rather only moves this characteristic up and down the light intensity ordinate, the use of the standardization-voltage arrangement provides for a wide range of film speeds and exposure time which may be used with the system for controlling the iris diaphragm. In summary, the diaphragm control system is a closed loop, positional servo system, the position characteristics of which are determined by the light intensity versus iris angular position to yield correct $f$-setting characteristics for the particular camera used. The positional characteristics is established by the control system described herein by the voltage versus wiper arm rotation of potentiometer 34 in the feedback circuit.

In one embodiment of the present invention, the operating characteristics for which the diaphragm control system was designed were: field of view, 1.3 degrees; range of operation, $f4.5$ to $f22$; response, $f4.5$ to $f22$ in one second; range of film speed, 10 to 200; and exposure time, compatible with the particular recording medium used within the range of $f4.5$ to $f22$.

Insofar as the physical construction of a camera incorporating the present invention is concerned, the photosensor must be mounted in a manner to have it view the scene just as lens device or devices are mounted.
Additionally, aside from the desirability of maintaining short mechanical couplings between the servo motor and the diaphragm, the electronic circuitry may conveniently be located more remotely therefrom.

Having described the principles of the present invention it is desirable not to limit the scope of the present invention to any specific embodiment used to describe the invention as others will immediately suggest themselves to persons skilled in the prior art without departing from the spirit and scope of the present invention. It is desired that the scope of the present invention be interpreted by the appended claims.

What is claimed is:

1. In a camera lens control system, servo means for controlling the effective area of the lens, voltage-comparison circuitry for controlling the energization of said servo means, and means including a photo-sensitive element for feeding voltage to said comparison circuitry, said voltage feeding means also including a voltage standardization network interposed between said photo-sensitive element and said comparison circuitry, and operative to shift the voltage level in proportion to the degree of deviation from predetermined speed-exposure factors.

2. The control system of claim 1, wherein said standardization network revises the voltage level in accordance with the formula $e_x \pm e_s = e_t$ wherein the term $e_x$ denotes the voltage output of the photo-sensitive element, the term $e_s$ denotes the correctional voltage combined therewith, and the term $e_t$ denotes the resultant effective voltage applied to said comparison circuitry.

References Cited in the file of this patent
UNITED STATES PATENTS 2,683,402    Bruck _____ July 13, 1954
2,913,969    Faulhaber _____ Nov. 24, 1959